Patented Aug. 1, 1939

2,167,779

UNITED STATES PATENT OFFICE 2,167,779

DYEINGS WITH POLYAZO DYES

Swanie S. Rossander, Wilmington, Del., assignor to E. I. du Pont de Nemours & Company, Wilmington, Del., a corporation of Delaware No Drawing. Application August 24, 1937, Serial No. 160,603

12 Claims. (Cl. 8—46)

This invention relates to polyazo dyes which are especially useful for dyeing cotton, regenerated cellulose and similar materials and produce dyeings having good discharge and fastness properties and especially superior fastness to washing; to fabrics dyed with the dyes; and to methods of making the dyes and dyeings.

It is an object of the invention to provide new colored, insoluble polyazo compounds. Another object of the invention is to provide polyazo dyes which give dyeings of good strength, excellent fastness to washing and good discharge properties and which are especially useful for dyeing cotton, regenerated cellulose and similar textile materials. Another object of the invention is to provide textiles dyed with the new dyes. Another object of the invention is to provide processes for making the dyes and the dyeings thereof. Still other objects of the invention will be apparent from the following description.

The objects of the invention are attained in general by coupling an azo dye coupling component to a tetrazotized dyestuff having the general formula

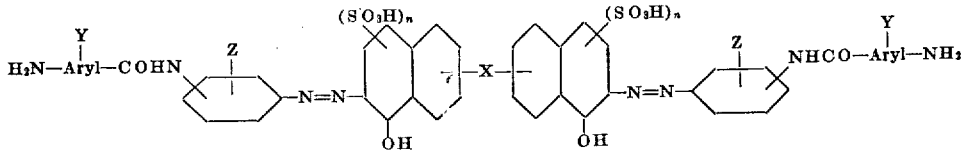

in which X is the group —NHCONH— or —NH—, $n$ is one or two, aryl is the radical of a benzene or naphthalene compound in which Y may be one or more than one hydrogen, alkyl, alkoxy or halogen groups, and Z may be one or more than one hydrogen, alkyl, alkoxy, halogen, carboxyl or sulfonic acid groups.

The benzene nuclei may be substituted by the aroyl-amino group in ortho, meta or para positions with respect to the azo group, the other positions of this nucleus being substituted or unsubstituted.

The aryl group is preferably the radical of a benzene compound in which the amino and carboxyl groups are meta or para to each other.

The condensation product from amino-naphthol-mono- and di-sulfonic acids which constitutes the bridging group may be made by methods well known in the art, such as Urea J-acid which is the condensation product of urea and J-acid, or the condensation product of two moles of J-acid prepared by a sodium bisulfite condensation forming Rhoduline acid. However any amino-naphthol-mono- or di-sulfonic acid having a free coupling position may be used as the starting compound to form the bridging group. In general it is satisfactory to use the mono-sulfonic acid derivatives, such as the derivatives of J-acid or gamma-acid, but the condensation products of other amino-naphthol-mono-sulfonic acids can be used. The corresponding condensation products of amino-naphthol-di-sulfonic acids can also be used. It is necessary in all cases to have free coupling positions in the condensation products which will readily couple with diazotized amines.

From the standpoint of ease of manufacture and general excellence of the products, the dyes of the type di(amino-benzoyl-amino-benzene-azo)-urea of 2-amino-5-naphthol-7-sulfonic acid are preferred, and of this type those in which the amino-benzoyl nuclei are meta-amino-benzoyl nuclei are preferred. In the preferred type the benzene nuclei may be substituted as hereinbefore indicated but excellent results are obtained without further substitutions than those indicated by the formula

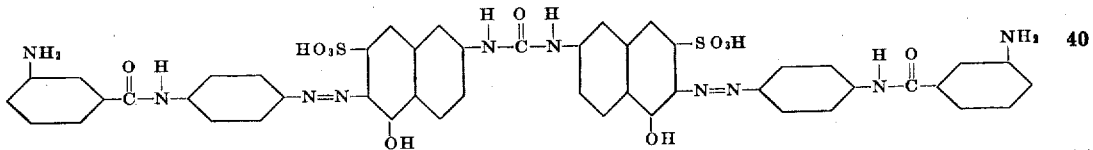

The indicated alkyl substituents of the aryl nuclei may be one or more methyl, ethyl, propyl and even longer chain alkyl groups. The corresponding alkoxy groups may be used in the same way as well as the halogens.

In the dyeing of textile fibres, the fibres are dyed with the above described compound, the compound is tetrazotized on the fibre and the dye is developed by coupling to an azo dye coupling component, for example beta-naphthol.

The invention is illustrated by the following examples but the invention is not limited to the illustrative embodiments.

*Example I*

Five parts of cotton piece goods were dyed in the usual manner known to those in the art with a solution containing two hundredths parts of (para-amino-benzoyl-meta-phenylene-diamine)₂ → urea J-acid. This dyestuff is soluble in water and dyes cotton, regenerated cellulose and similar materials. It may be made by coupling in alkaline medium two mols of diazotized meta-nitro-benzoyl-meta-phenylene-diamine to one mole of the condensation product of J-acid and urea, salting out the product of coupling, slurring the product in water, reducing the nitro groups by adding sodium disulphide solution and separating from the reaction medium.

lar to those of Example I and the colors of the dyeings are shown. The dyestuffs are indicated by the compounds which were used in their preparation. An arrow indicates coupling and points from the amino-aryl-azo group toward the compound which is coupled thereto. For example the diazo component indicated in Example II is two of the group

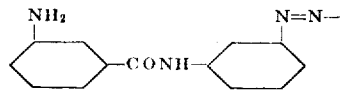

coupled to the radical of the condensation product of urea and J-acid. This compound is dyed on the fibre and tetrazotized. The tetrazotized compound is then coupled to the coupling component which is indicated.

| Example | Diazo component | Coupling component | Shade on cotton and regenerated cellulose |
|---|---|---|---|
| II | (Meta-amino-benzoyl-meta-phenylene-diamine)₂→urea J-acid | Beta naphthol | Orange. |
| III | do | 1-phenyl-3-methyl-5-pyrazolone | Yellow orange. |
| IV | do | Aceto-acetanilide | Do. |
| V | do | Meta-tolylene-diamine | Orange. |
| VI | (Para-amino-benzoyl-meta-phenylene-diamine)₂→urea J-acid | 1-phenyl-3-methyl-5-pyrazolone | Yellow orange. |
| VII | (Para-amino-benzoyl-para-phenylene diamine)₂→rhoduline acid | Beta naphthol | Orange. |
| VIII | do | 1-phenyl-3-methyl-5-pyrazolone | Yellow orange. |
| IX | (Meta-amino-benzoyl-meta-phenylene-diamine)₂→urea J-acid | Beta naphthol | Orange. |
| X | (Para-amino-benzoyl-para-phenylene diamine)₂→urea J-acid | do | Do. |

The dyed fabric was rinsed in cold water and put in 200 parts of water at 20° C. Three tenths parts of sodium nitrite and four tenths parts of sulfuric acid were added to the water and the goods were stirred for 15 minutes and then rinsed with cold water.

One tenth part of beta naphthol was dissolved in 200 parts of water containing one twentieth The principal uses of the products of the invention are for purposes of dyeing textiles. For this purpose the products are not valuable except when they are produced on the fibre, but the products of coupling can be made in substance and used for other purposes.

The products of the invention are represented generally by the formula

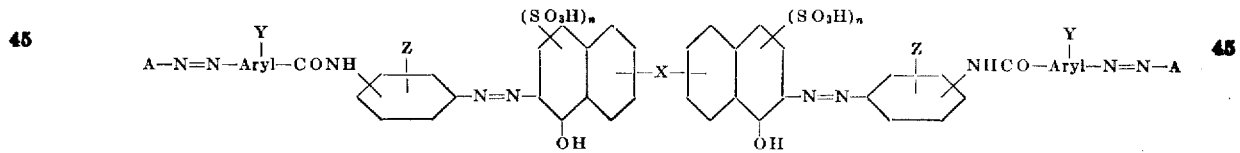

part of caustic soda. The solution was stirred rapidly, the rinsed piece goods were added and stirring was continued for 15 minutes. Finally the goods were rinsed in cold water and dried. The dyeing was a bright orange shade. The probable formula of the dye on the fiber is:

in which A is the radical of an azo dye coupling component and the other symbols have the values hereinbefore explained.

Azo dye coupling components which are free from solubilizing groups, such as sulfonic acid and carboxyl are used for developing the dyes.

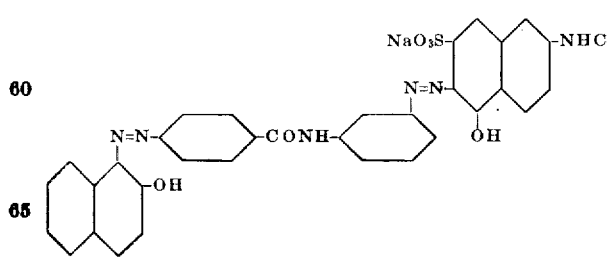

The dyed material was found to have outstanding fastness to washing, good discharge properties and good fastness to the exposures ordinarily encountered by dyed fabrics.

In the following examples the dyestuffs were prepared and the dyeings were made and developed by methods similar to the methods described in Example I. The results were in general simi- Beta naphthol, 1-phenyl-3-methyl-5-pyrazolone, aceto-acetanilide and meta-tolylene-diamine are mentioned as illustrations of satisfactory developing agents. Beta naphthol produces developed dyeings of generally excellent properties and outstanding washing fastness, and it is the preferred developing agent.

Since from the foregoing description of the invention it will be apparent to those skilled in the art that many embodiments of the invention may be made without departing from the spirit and scope thereof, it is to be understood that no limitations are intended in the annexed claims except those which are specifically recited or are imposed by the prior art.

I claim:

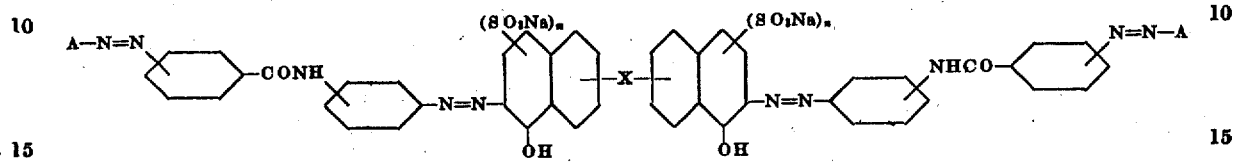

1. The compound represented by the formula

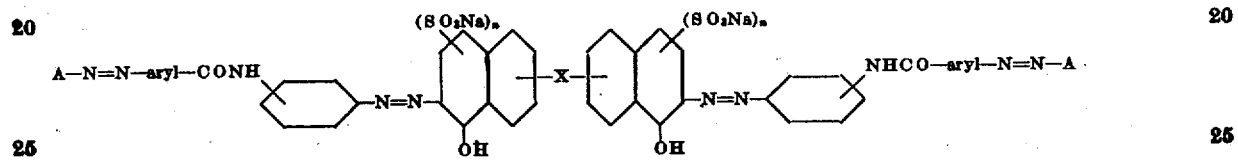

in which A is the radical of an azo dye coupling component which is devoid of solubilizing groups, X is one of the groups —NH—CO—NH— and —NH—, $n$ is one of the integers 1 and 2, aryl is one of the group consisting of the radicals of benzene compounds and naphthalene compounds, aryl being substituted by —CONH— in one of the positions meta and para with respect to the azo bridge.

2. The compound represented by the formula the intermediate azo bridges, Y being at least one of the group consisting of hydrogen, alkyl, alkoxy, halogen and Z being at least one of the group consisting of hydrogen, alkyl, alkoxy, halogen carboxyl and sulfonic acid and the groups A—N=N— being connected to aryl in one of the positions meta and para to the groups —CONH—.

3. The compound represented by the formula

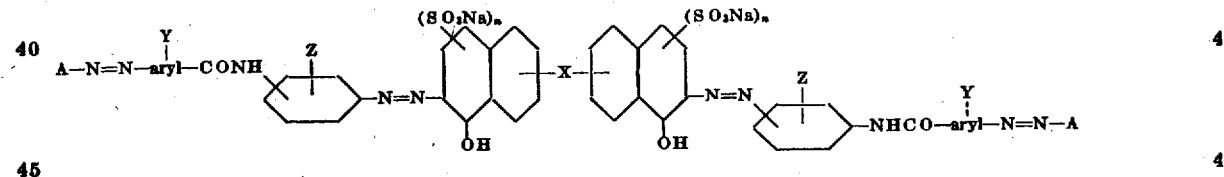

in which A is the radical of an azo dye coupling component which is devoid of solubilizing groups, X is one of the groups —NH—CO—NH— and —NH—. $n$ is an integer not greater than two, the end azo groups are substituted in the end benzene nuclei in one of the positions meta and para with respect to the groups CONH, and the groups —CONH— are connected to the intermediate benzene nuclei in one of the positions ortho, meta and para to the intermediate azo bridges.

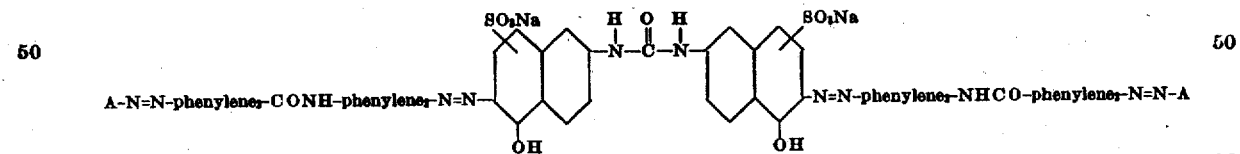

in which A is the radical of one of the group

4. The compound represented by the formula consisting of beta naphthol, 1-phenyl-3-methyl-5-pyrazolone, aceto-acetanilide and meta-tolylene-diamine, X is one of the groups

—NH—CO—NH— and —NH—, $n$ is one of the integers 1 and 2, aryl is one of the group consisting of the residues of benzene nuclei and naphthalene nuclei, the benzene nuclei of the azo-benzene groups being substituted by amino-aroyl in one of the positions ortho, meta and para with respect to in which A is the radical of one of the group consisting of beta naphthol, 1-phenyl-3-methyl-5-pyrazolone, aceto-acetanilide and meta-tolylene-diamine, phenylene$_2$ is one of the group consisting of the radicals of benzene compounds wherein the azo bridge is in one of the positions ortho and para with respect to —CONH, and phenylene$_2$ is one of the group consisting of the radicals of benzene compounds wherein the group CONH— is in one of the positions ortho, meta and para with respect to the azo bridge.

5. The compound represented by the formula

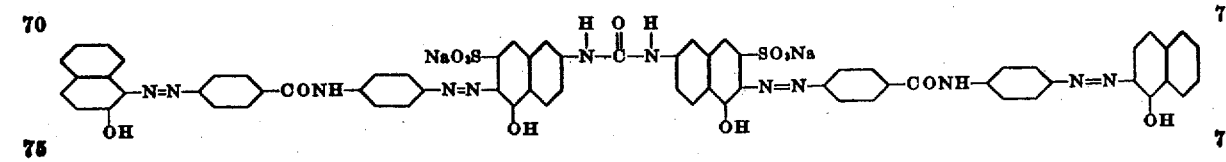

6. The compound represented by the formula

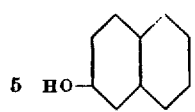 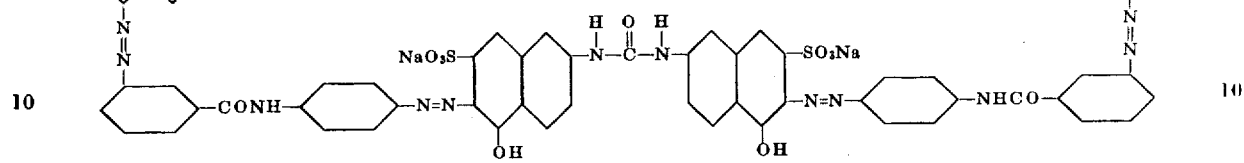 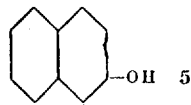

7. The compound represented by the formula

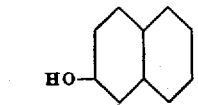 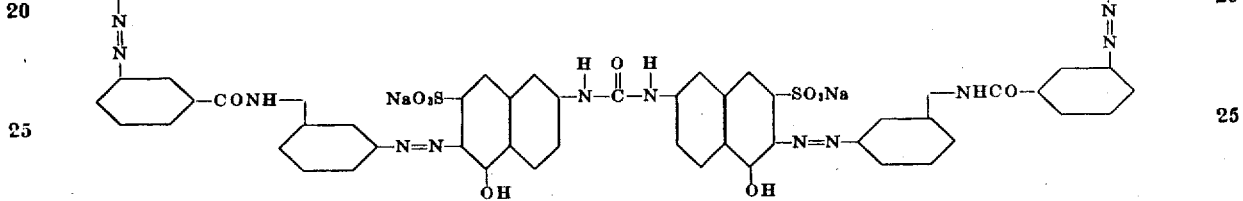 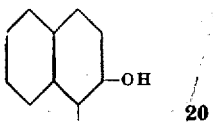

8. The process which comprises dyeing textile fibres with a dyestuff represented by the formula

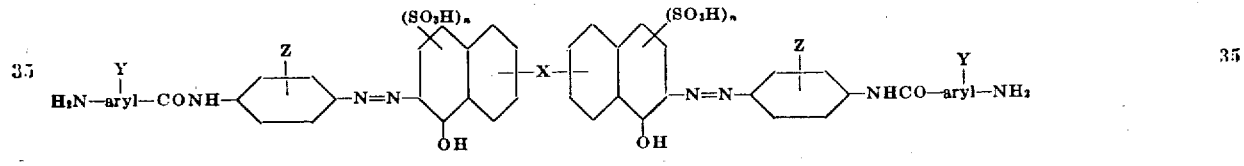

in which X is one of the groups —NH—CO—NH— and —NH—, $n$ is one of the integers 1 and 2, aryl is one of the group consisting of the residues of benzene and naphthalene nuclei, the intermediate azo-benzene nucleus being substituted by CONH— in one of the positions ortho, meta and para with respect to the azo bridge, Y being one of the group consisting of hydrogen, alkyl, alkoxy and halogen, and Z being one of the group consisting of hydrogen, alkyl, alkoxy, carboxyl and sulfonic acid, diazotizing the compound on the fibre and coupling to an azo dye coupling component which is free from solubilizing groups.

9. The process which comprises dyeing a textile fibre with a dyestuff represented by the formula $n$ is an integer not greater than two, the end azo benzene groups are substituted in one of the positions meta and para with respect to the azo bridge, and the intermediate benzene nuclei are connected to CONH— and to the azo bridge in one of the positions ortho, meta and para, diazotizing the compound on the fibre and coupling to an azo dye coupling component from the group consisting of beta naphthol, 1-phenyl-3-methyl-5-pyrazolone, aceto-acetanilide and meta-tolylene-diamine.

10. The process which comprises dyeing a textile fabric with a dyestuff represented by the formula

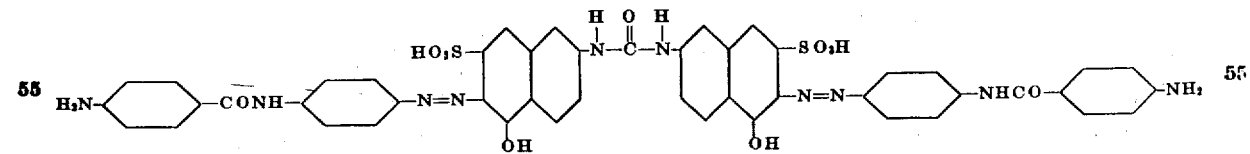

diazotizing the dyestuff on the fibre and coupling to an azo dye coupling component from the group consisting of beta naphthol, 1-phenyl-3-methyl-5-pyrazolone, acetone-acetanilide and meta-tolylene-diamine.

11. The process which comprises dyeing a tex-

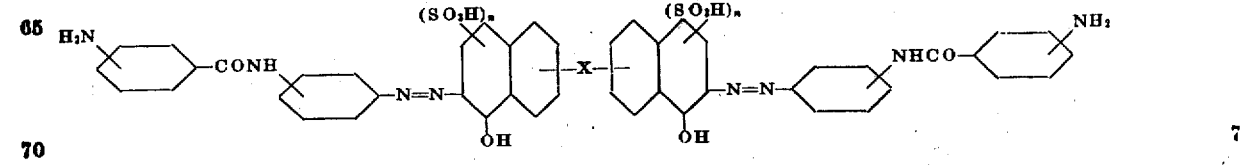

in which X is one of the groups

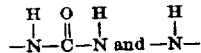

tile fabric with a dyestuff represented by the formula

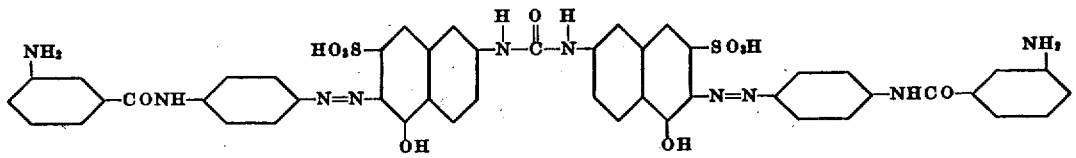

diazotizing the dyestuff on the fibre and coupling to an azo dye coupling component from the group consisting of beta naphthol, 1-phenyl-3-methyl-5-pyrazolone, aceto-acetanilide and metal-tol-ylene-diamine.

12. The process which comprises dyeing a textile fabric with a dyestuff represented by the formula

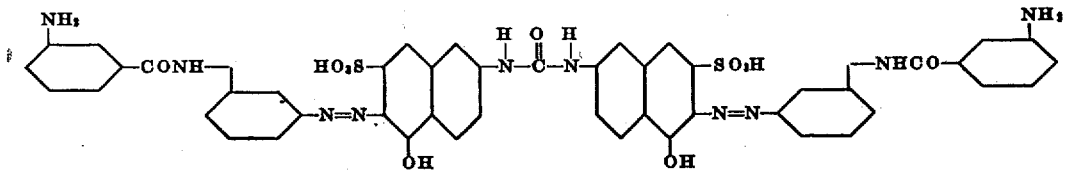

diazotizing the dyestuff on the fibre and coupling to an azo dye coupling component from the group consisting of beta naphthol, 1-phenyl-3-methyl-5-pyrazolone, aceto-acetanilide and meta-tol-ylene-diamine.

SWANIE S. ROSSANDER.

CERTIFICATE OF CORRECTION.

Patent No. 2,167,779.　　　　　　　　　　　　　　　　　August 1, 1939.

SWANIE S. ROSSANDER.

It is hereby certified that error appears in the printed specification of the above numbered patent requiring correction as follows: Page 5, first column, line 13-14, claim 11, for "metal-tol-ylene" read meta-tolylene; and that the said Letters Patent should be read with this correction therein that the same may conform to the record of the case in the Patent Office.

Signed and sealed this 26th day of September, A. D. 1939.

(Seal)　　　　　　　　　　　　　　　　　　　　　　　　Henry Van Arsdale,
　　　　　　　　　　　　　　　　　　　　　　　Acting Commissioner of Patents.

tile fabric with a dyestuff represented by the formula

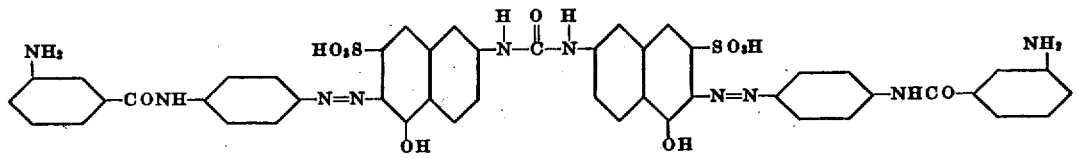

diazotizing the dyestuff on the fibre and coupling to an azo dye coupling component from the group consisting of beta naphthol, 1-phenyl-3-methyl-5-pyrazolone, aceto-acetanilide and metal-tol-ylene-diamine.

12. The process which comprises dyeing a textile fabric with a dyestuff represented by the formula

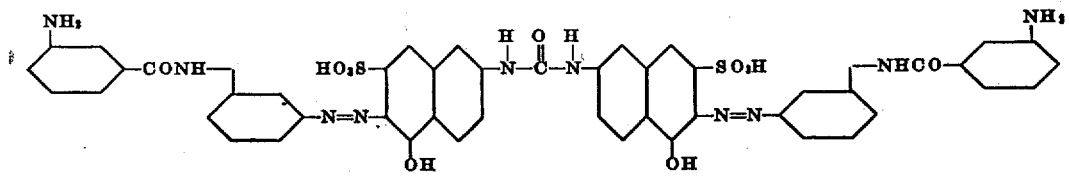

diazotizing the dyestuff on the fibre and coupling to an azo dye coupling component from the group consisting of beta naphthol, 1-phenyl-3-methyl-5-pyrazolone, aceto-acetanilide and meta-tolylene-diamine.

SWANIE S. ROSSANDER.

CERTIFICATE OF CORRECTION.

Patent No. 2,167,779. August 1, 1939.

SWANIE S. ROSSANDER.

It is hereby certified that error appears in the printed specification of the above numbered patent requiring correction as follows: Page 5, first column, line 13-14, claim 11, for "metal-tol-ylene" read meta-tolylene; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.